(12) United States Patent
Chen

(10) Patent No.: US 7,742,871 B2
(45) Date of Patent: Jun. 22, 2010

(54) INTELLIGENT FUEL OIL MONITORING SYSTEM AND METHOD

(75) Inventor: Yuan-Lin Chen, Taipei Hsien (TW)

(73) Assignee: Mingchi University of Technology, Taipei Hsien (TW)

( * ) Notice: Subject to any disclaimer, the term of this patent is extended or adjusted under 35 U.S.C. 154(b) by 259 days.

(21) Appl. No.: 11/980,826

(22) Filed: Oct. 31, 2007

(65) Prior Publication Data

US 2008/0255755 A1 Oct. 16, 2008

(30) Foreign Application Priority Data

Apr. 13, 2007 (TW) .............................. 96112999 A

(51) Int. Cl.
*G06F 19/00* (2006.01)
(52) U.S. Cl. ..................... 701/123; 701/104; 340/616
(58) Field of Classification Search ................ 701/103, 701/104, 123; 340/616, 618, 623, 426.15, 340/438, 439; 73/1.02, 19.1; 137/68.14
See application file for complete search history.

(56) References Cited

U.S. PATENT DOCUMENTS

| 7,135,981 | B1* | 11/2006 | Lafontaine ................... 340/618 |
| 2006/0184307 | A1* | 8/2006 | Kosaka ......................... 701/110 |
| 2006/0260681 | A1* | 11/2006 | Reid et al. ................ 137/68.14 |

* cited by examiner

*Primary Examiner*—Gertrude Arthur Jeanglaud
(74) *Attorney, Agent, or Firm*—Ming Chow; Sinorica, LLC

(57) ABSTRACT

An intelligent fuel oil monitoring system includes a fuel level detector coupled to a fuel tank of a motor vehicle to detect the amount of the fuel oil in the fuel tank, a microcontroller coupled to the fuel level detector to receive traveling data of the motor vehicle and to establish an average speed-fuel consumption relationship curve and fuel consumption and travel distance relationship curves at different speeds and to calculate the distance the motor vehicle can travel based on the amount of the fuel oil detected by the fuel level detector subject to the fuel consumption and travel distance relationship curve, and a display unit coupled to the microcontroller and controlled by the microcontroller to display data.

2 Claims, 9 Drawing Sheets

INTELLIGENT FUEL OIL MONITORING SYSTEM AND METHOD

BACKGROUND OF THE INVENTION

1. Field of the Invention

The present invention relates to the monitoring of the fuel oil of a motor vehicle and more particularly, to an intelligent fuel oil monitoring system and method that accurately displays on a display unit the rest amount of the fuel oil and the estimated mileage the vehicle could travel.

2. Description of the Related Art

Regular oil meters for motor vehicle commonly use a float to detect the rest amount of fuel oil in the fuel tank and to indicate the current amount of fuel by means of FULL, ¾, ½, ¼ and EMPTY. This indication is an estimated value of the current fuel tank capacity. This float type fuel oil measuring system uses a float to detect the fuel oil level, causing a variable resistor to change its resistance subject to the change of the fuel oil level, and the change of the resistance value of the variable resistor drives the oil meter to indicate the rest fuel oil amount.

The indication of the aforesaid float type fuel oil measuring system is limited to upper and lower limits. The oil meter always indicates FULL when over the upper limit, or EMPTY when below the lower limit. Because regular fuel tanks have an irregular shape, every scale represents a different amount. Based on the indication of the oil meter of the motor vehicle, the driver must estimate the mileage the motor vehicle can go by means of experience. When the fuel oil is at a low level, the driver may be getting anxious, and may worry about finding no gas station and roadside breakdown. Therefore, regular oil meters have drawbacks as follows:

1. The pointer of the oil meter is still aimed at FULL after the fuel tank has been fully filled with fuel oil and the car has run for a certain distance, and the driver may misunderstand the indication of the oil meter.
2. Every scale indicated by the pointer of the oil meter represents a different amount of fuel oil for a different mileage to go, and the driver may misjudge the mileage the car could go with the rest amount of fuel oil.
3. When the pointer is aimed at EMPTY, the driver cannot know the actual rest amount of fuel oil and may worry about roadside breakdown and become anxious in finding a gas station, bringing negative effects on traffic safety.
4. When the indicator light of the oil meter is on, the driver will become more anxious.

Therefore, it is desirable to provide a motor vehicle fuel oil monitoring system that eliminates the aforesaid drawbacks.

SUMMARY OF THE INVENTION

The present invention has been accomplished under the circumstances in view. It is the main object of the present invention to provide an intelligent fuel oil monitoring system and method that accurately measures the amount of the fuel oil, estimates the mileage the motor vehicle could travel based on the rest amount of fuel oil and subject to the driver's driving conditions, and finds the most optimal driving mode for the driver subject to the fuel consumption and mileage relationship, thereby saving fuel consumption and improving the driving efficiency.

To achieve this and other objects of the present invention, the intelligent fuel oil monitoring system comprises a fuel level detector coupled to a fuel tank of a motor vehicle and adapted to detect the amount data of a fuel oil in the fuel tank; a microcontroller coupled to the fuel level detector and adapted to receive traveling data of the motor vehicle and to establish an average speed-fuel consumption relationship curve and fuel consumption and travel distance relationship curves at different speeds and to calculate the distance the motor vehicle to travel based on the amount data of the fuel oil detected by the fuel level detector subject to the fuel consumption and travel distance relationship curve; and a display unit coupled to the microcontroller and controlled by the microcontroller to display data.

To achieve this and other objects of the present invention, the intelligent fuel oil monitoring method comprises the steps of: (1) using a fuel level detector to detect the fuel level of a fuel tank; (2) providing the traveling data of a motor vehicle; (3) using a computing device to receive the traveling data of the motor vehicle and to establish an average speed-fuel consumption relationship curve and fuel consumption-travel distance relationship curves subject to the received data; and (4) informing the driver of the motor vehicle the value of the rest amount of fuel oil and the mileage the motor vehicle capable to travel.

DETAILED DESCRIPTION OF THE PREFERRED EMBODIMENT

Figure 1A:
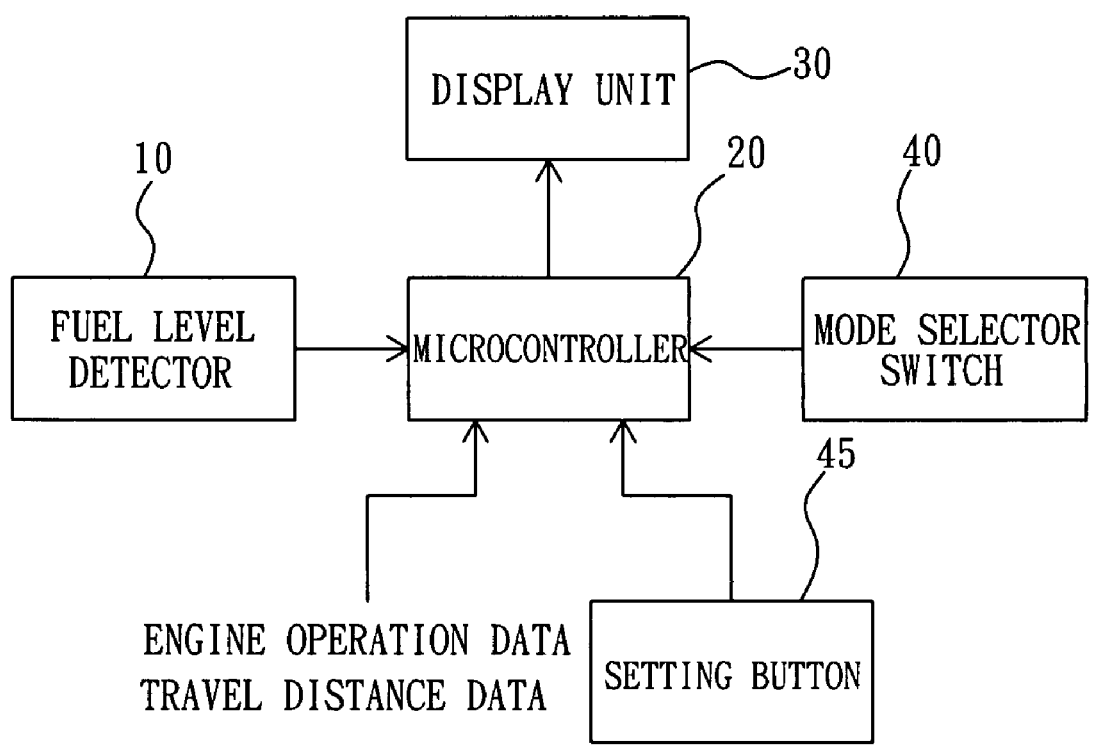
FIG. 1a is a system block diagram of an intelligent fuel oil monitoring system in accordance with the present invention.
Figure 1B:
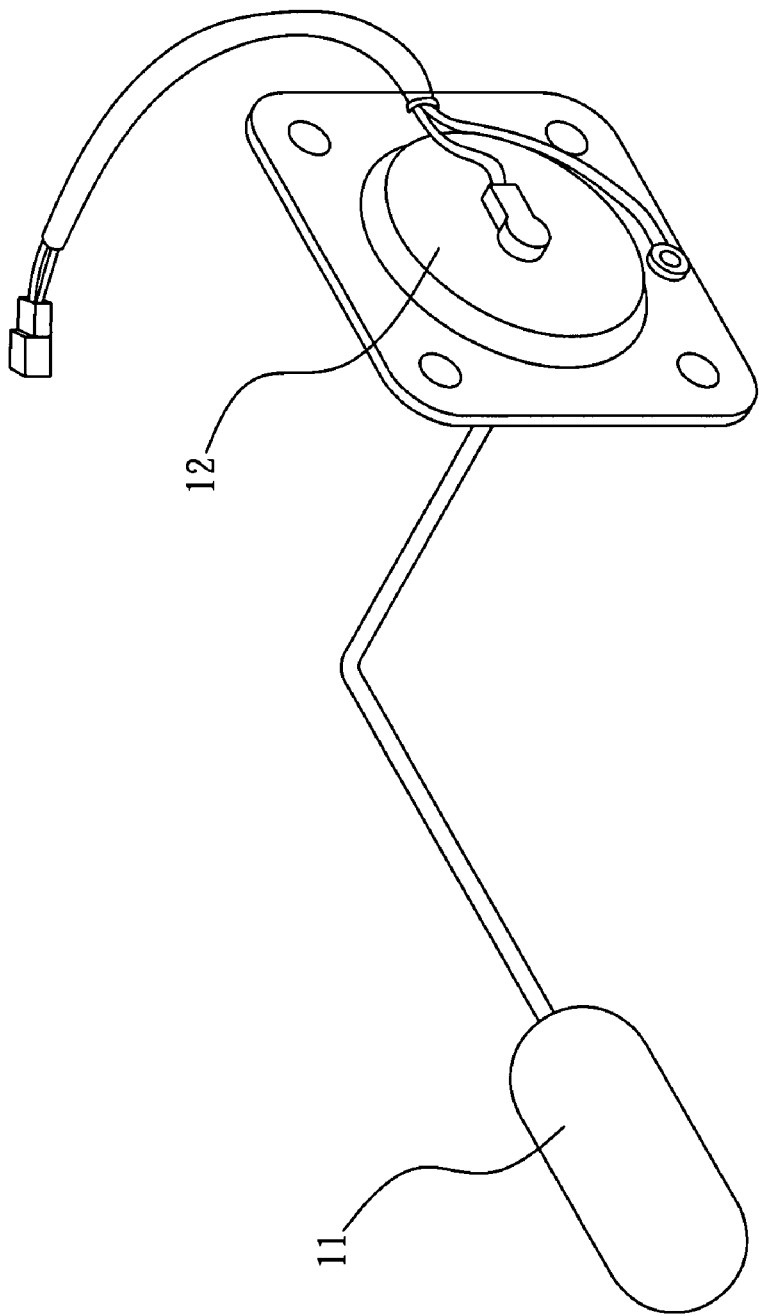
FIG. 1b is an elevational view of a fuel level detector for the intelligent fuel oil monitoring system according to the present invention.

Referring to FIGS. 1a and 1b, an intelligent fuel oil monitoring system in accordance with the present invention is shown comprised of a fuel level detector 10, a microcontroller 20, and a display unit 30.

The fuel level detector 10 is coupled to the fuel tank (not shown) of a motor vehicle to detect the amount of fuel oil in the fuel tank. According to this embodiment, the fuel level detector 10 is a float type fuel level detector comprising a float 11 and a variable resistor 12. The variable resistor 12 changes its resistance output value subject to the position of the float 11. Because this float type fuel level detector is of the known art, no further detailed description in this regard is necessary.

Figure 3:
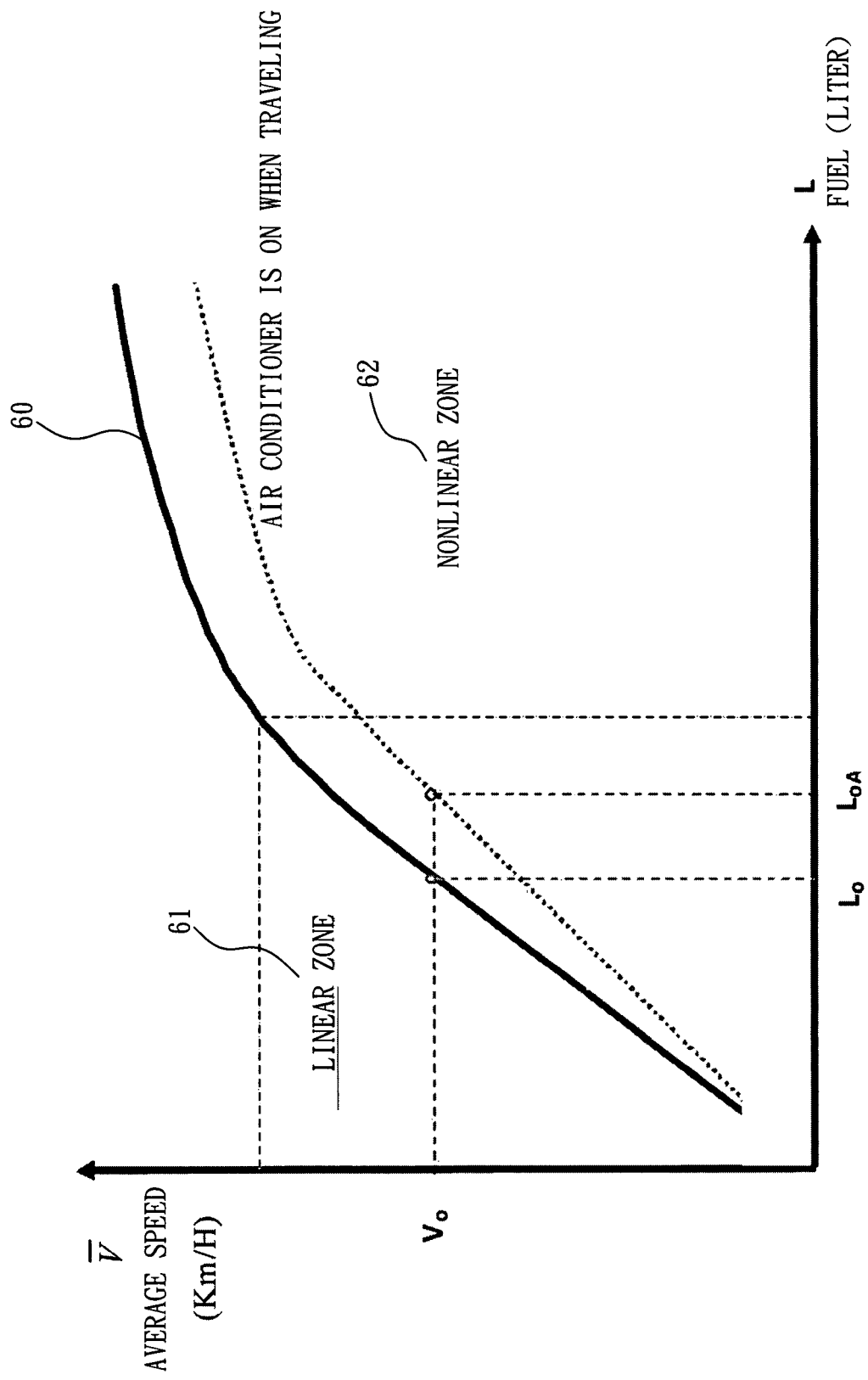
FIG. 3 is an average speed-fuel consumption relationship curve obtained from a motor vehicle according to the present invention

The microcontroller 20 is electrically coupled to the fuel level detector 10, and adapted to receive engine running data and mileage data of the motor vehicle and to establish a fuel oil-average speed relationship curve 60 (see FIG. 3). The microcontroller 20 further has a statistical analysis function.

It analyzes the relationship between the fuel consumption amount and mileage of the motor vehicle and estimates the optimal driving mode for reference subject to the analysis result. The algorithm adopts, preferably, Kalman Filter to estimate the optical driving mode.

The display unit 30 is coupled to the microcontroller 20 for displaying data. The display unit 30 can be a LCD or LED monitor. After receipt of fuel oil data, the microcontroller 20 calculates the mileage the motor vehicle could go subject to the fuel oil-average speed relationship curve 60, and then displays the mileage on the display unit 30.

The intelligent fuel oil monitoring system of the present invention further comprises a mode selector switch 40 coupled to the microcontroller 20 for liter/gallon and kilometer/file display selection.

The intelligent fuel oil monitoring system of the present invention further comprises a setting button 45 coupled to the microcontroller 20 for the setting of the amount of fuel oil to be added.

Figure 2:
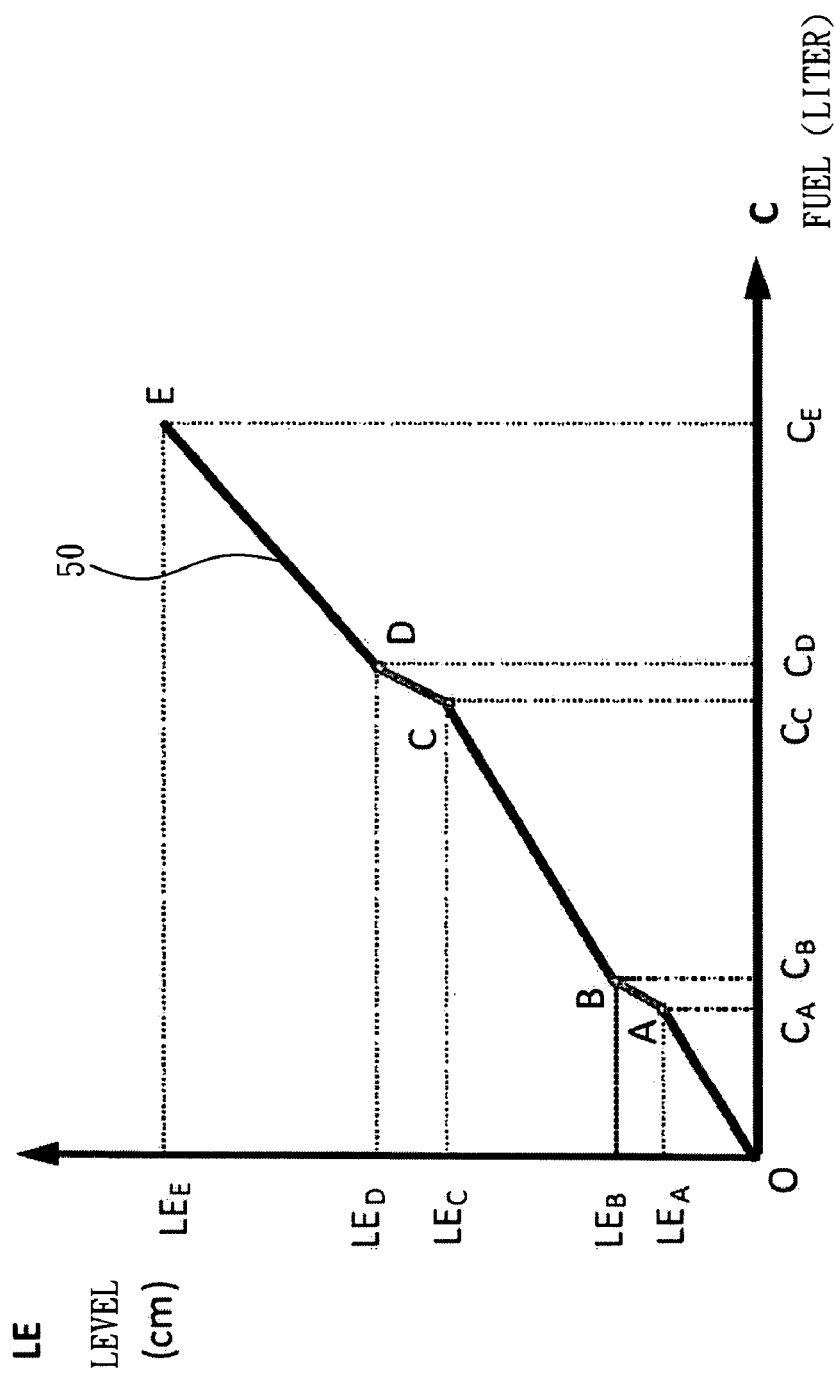
FIG. 2 is a capacity-amount relationship curve obtained from a regular fuel tank according to the present invention.

FIG. 2 is a capacity-amount relationship curve of a regular fuel tank. In order to fully utilize the limited space, the fuel tank of a regular motor vehicle has an irregular shape designed subject to the structure of the motor vehicle. A conventional float type fuel oil detector cannot accurately measures the amount of fuel oil in a fuel tank. The invention establishes a fuel oil level and amount relationship curve 50 and stores it in the microcontroller 20. As shown in FIG. 2, the longitudinal coordinate indicates the fuel oil level, and the transverse coordinate indicates the amount of fuel oil. As illustrated, the area of the space between $LE_A \sim LE_B$ of the fuel tank corresponding to the curve segment AB and the area of the space between $LE_C \sim LE_D$ of the fuel tank corresponding to the curve segment CD are relatively contracted when compared to the other space of the fuel tank. Therefore, any irregular fuel tank can be measured to provide a specific capacity-amount relationship curve. When this curve is established, accurate calculation of the fuel oil amount becomes easy.

FIG. 3 is an average speed-fuel consumption relationship curve obtained from a motor vehicle according to the present invention. According to the average speed-fuel consumption relationship curve, referenced by 60, the transverse coordinate represents the fuel consumption, and the longitudinal coordinate represents the average speed of the motor vehicle. The average speed-fuel consumption relationship curve 60 further comprises a linear zone 61 and a nonlinear zone 62. The average speed within the linear zone 61 is directly proportional to the fuel consumption. When increase the speed after over this linear zone 61, the fuel consumption is greatly increased because of increasing of wind resistance. According to FIG. 3, when the motor vehicle runs at speed $V_O$ for a certain length of time, the fuel consumption is $L_O$, and the fuel consumption will be increased to $L_{OA}$ as if the air conditioner is in operation. When the other factors (window opened or not?; window opening status?; change of load, etc.) remain unchanged, FIG. 3 explains the relationship between the average speed and fuel consumption of the motor vehicle.

Figure 4:
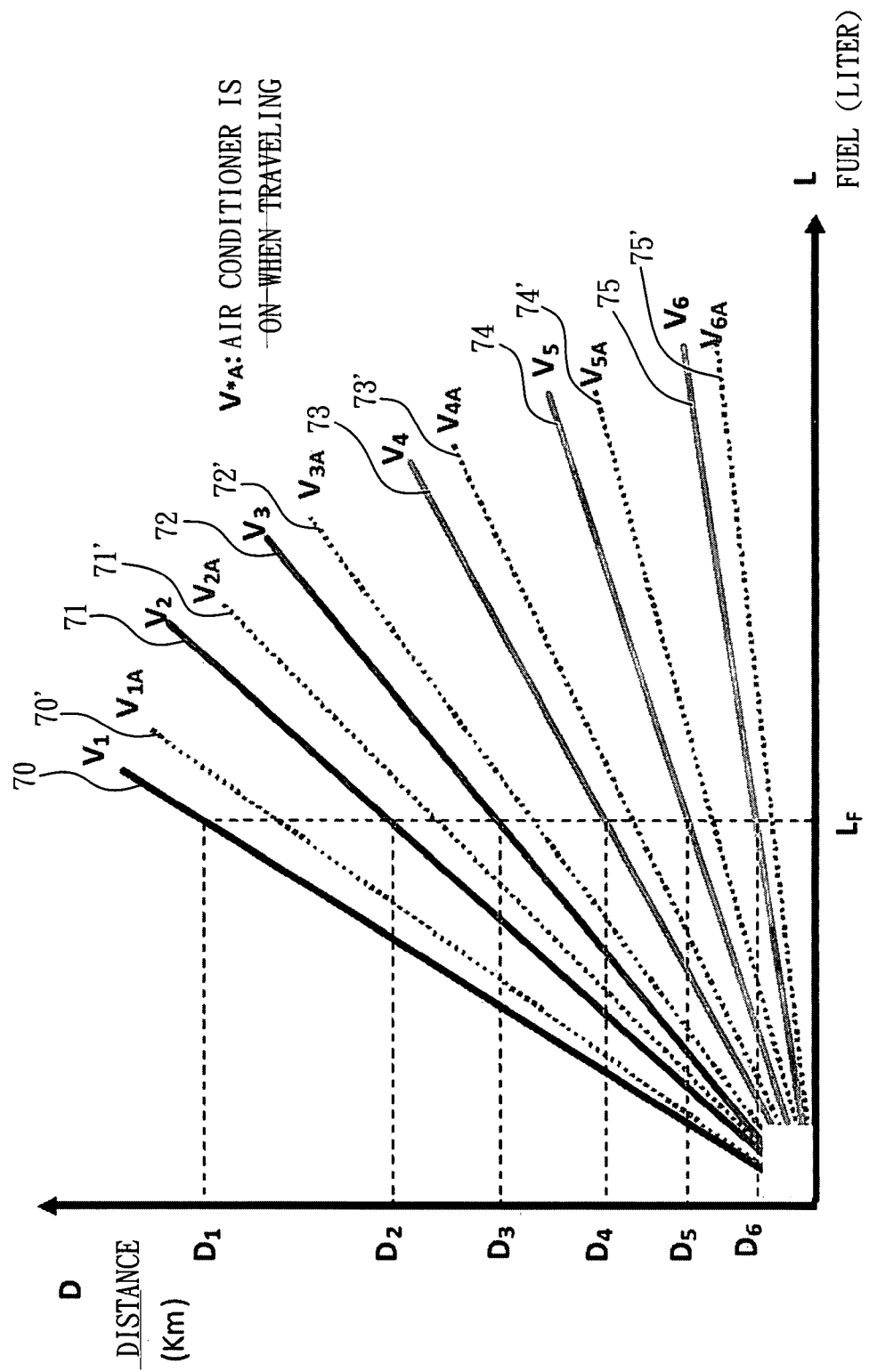
FIG. 4 is a chart of consumption-distance relationship curves obtained from a regular motor vehicle.

FIG. 4 is a chart of fuel consumption-distance relationship curves obtained from a regular motor vehicle according to the present invention. When within the linear zone 61 shown in FIG. 3 (long period low speed running condition is excluded), fuel consumption (L)-distance (D) relationship curves 70~75 are obtained from different speeds. As illustrated, one same fuel amount $L_F$ allows the motor vehicle to move to different distances D when at different speeds and when under same driving conditions. As illustrated, when the speeds are $V_1, V_2, V_3, V_4, V_5$ and $V_6$, the distances will be $D_1, D_2, D_3, D_4, D_5$ and $D_6$ respectively, wherein $V_1 > V_2 > V_3 > V_4 > V_5 > V_6$, thus $D_1 > D_2 > D_3 > D_4 > D_5 > D_6$. When the air conditioner is on, the fuel consumption (L)-distance (D) relationship curves 70'~75' are obtained. When within the nonlinear zone 62, $V_1 > V_2 > V_3 > V_4 > V_5 > V_6$ may not result in the order of $D_1 > D_2 > D_3 > D_4 > D_5 > D_6$, and the result of $D_1 < D_2$ may be obtained when $V_1 > V_2$, i.e. the distance to go may be shorter at a relatively faster speed when compared to same fuel consumption at a relative slower speed.

Figure 5:
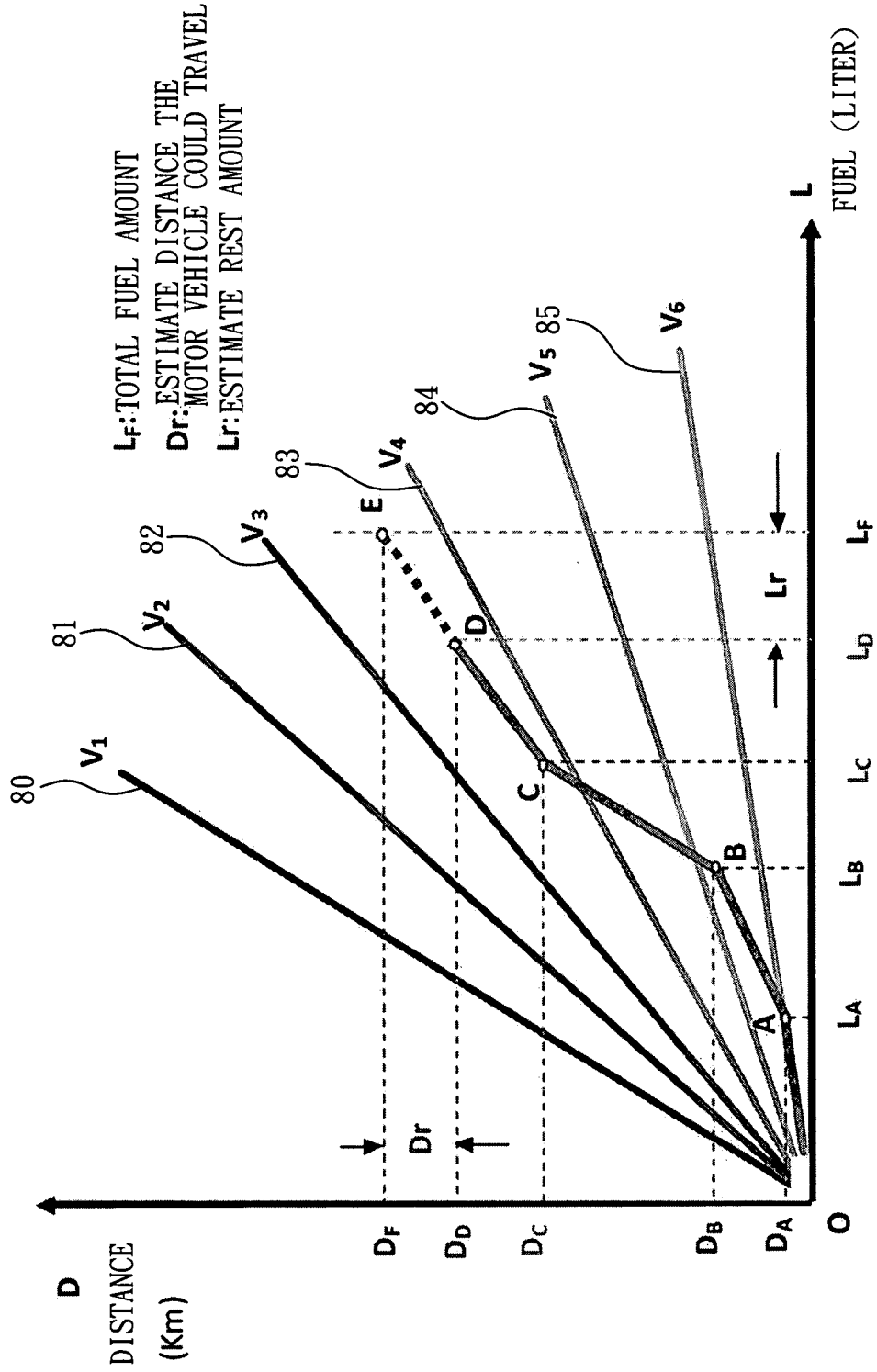
FIG. 5 is a schematic drawing showing the estimation of the distance the motor vehicle could travel.

FIG. 5 is a schematic drawing showing the estimation of the distance the motor vehicle could travel. When within the nonlinear zone 62, the fuel consumption-distance relationship can still be figured out to establish the data, i.e., to obtain the fuel consumption (L)-distance (D) relationship curves 80~85 at different speeds, and then to calculate the mileage the motor vehicle could go subject to these fuel consumption (L)-distance (D) relationship curves 80~85 and to estimate the distance of the motor vehicle could go Dr. In FIG. 5, $L_F$ represents the total amount of fuel oil, if the motor vehicle runs at speed $V_6$ for a distance $D_A$, i.e., $$D_A = a(V_6)L_A = V_6 t_A \quad (1)$$

In which, $a(V_6)$ is the linear slope of $V_6$ in FIG. 5 at speed $V_6$ (i.e., along curve 85); it traveled to point A after time $t_A$, and then traveled at speed $V_4$ from point A to point B (in parallel to curve 83), and the total travel distance at this time is:

$$D_A + (D_B - D_A) = a(V_6)L_A + a(V_4)(L_B - L_A) = V_6 t_A + V_4 t_B \quad (2)$$

In which, $a(V_4)$ is the linear slope of $V_4$ in FIG. 5 at speed $V_4$, $L(V_4)$ is the fuel consumption at speed $V_4$; it traveled to point B after time $t_B$, and then traveled at speed $V_1$ from point B to point C (in parallel to curve 80), and then traveled at speed $V_3$t from point C to point D (in parallel to curve 82), and the rest amount of fuel oil is:

$$Lr = L_F - L_D \quad (3)$$

and the distance the motor vehicle could travel is:

$$Dr = a(V_3)Lr = a(V_3)(L_F - L_D) \quad (4)$$

Figure 6A:
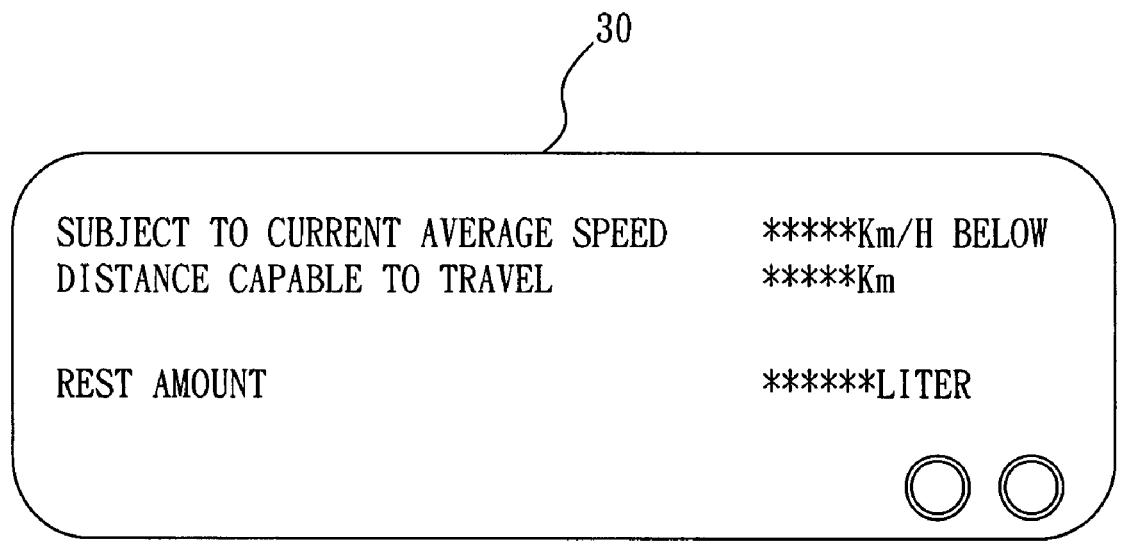
FIG. 6a indicates the indication of the intelligent fuel oil monitoring system of the distance the motor vehicle could travel based on the current average speed.
Figure 6B:
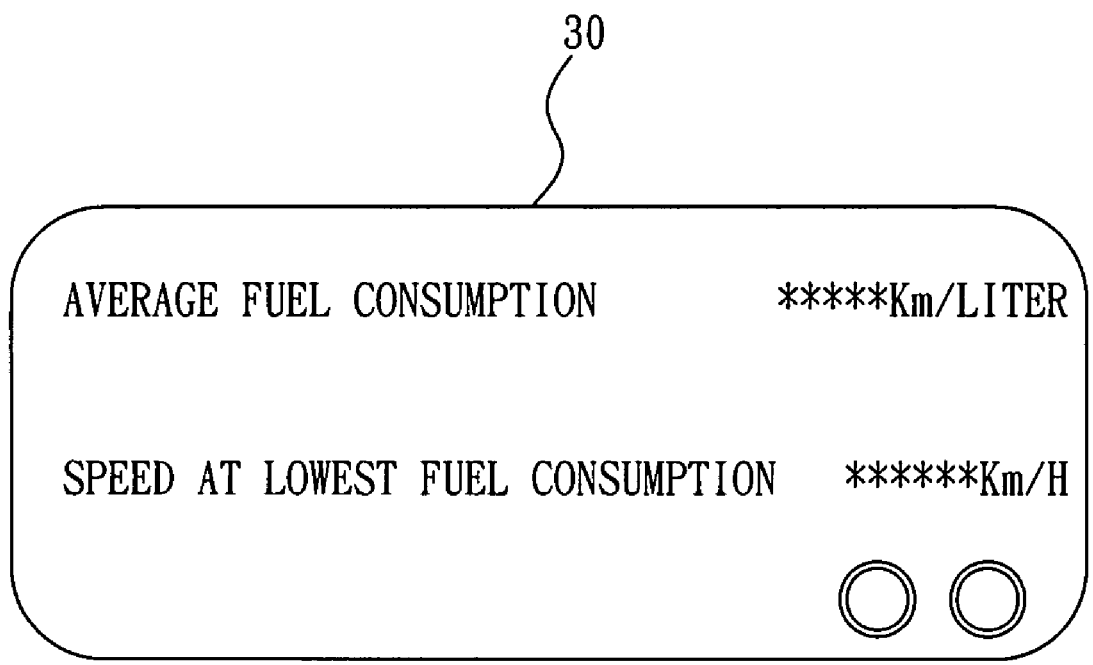
FIG. 6b indicates the indication of the intelligent fuel oil monitoring system of the distance the motor vehicle could travel based on the current average fuel consumption.

FIG. 6a indicates the indication of the intelligent fuel oil monitoring system of the distance the motor vehicle could travel based on the current average speed. FIG. 6b indicates the indication of the intelligent fuel oil monitoring system of the distance the motor vehicle could travel based on the current average fuel consumption. During operation of the intelligent fuel oil monitoring system, the fuel oil data detected by the fuel level detector 10 is used, and the driver can operate the setting button 45 to set the amount of fuel oil to be added. Alternatively, the amount of fuel oil to be added can be calculated by the microcontroller 20. The microcontroller 20 establishes the fuel consumption (L)-distance (D) relationship curves 70~75 subject to the engine operation data of the motor vehicle and the traveled mileage data. The microcontroller 20 further has a learning function. Subject to the aforesaid data, the microcontroller 20 estimates the accurate value of the current rest amount of fuel oil and the mileage the motor vehicle could travel, and displays the estimated data on the display unit 30 for reference. The microcontroller 20 also has statistical analysis function to analyze the relationship between the fuel consumption and the traveled distance and to further obtain the most optimal driving mode for reference.

Figure 7:
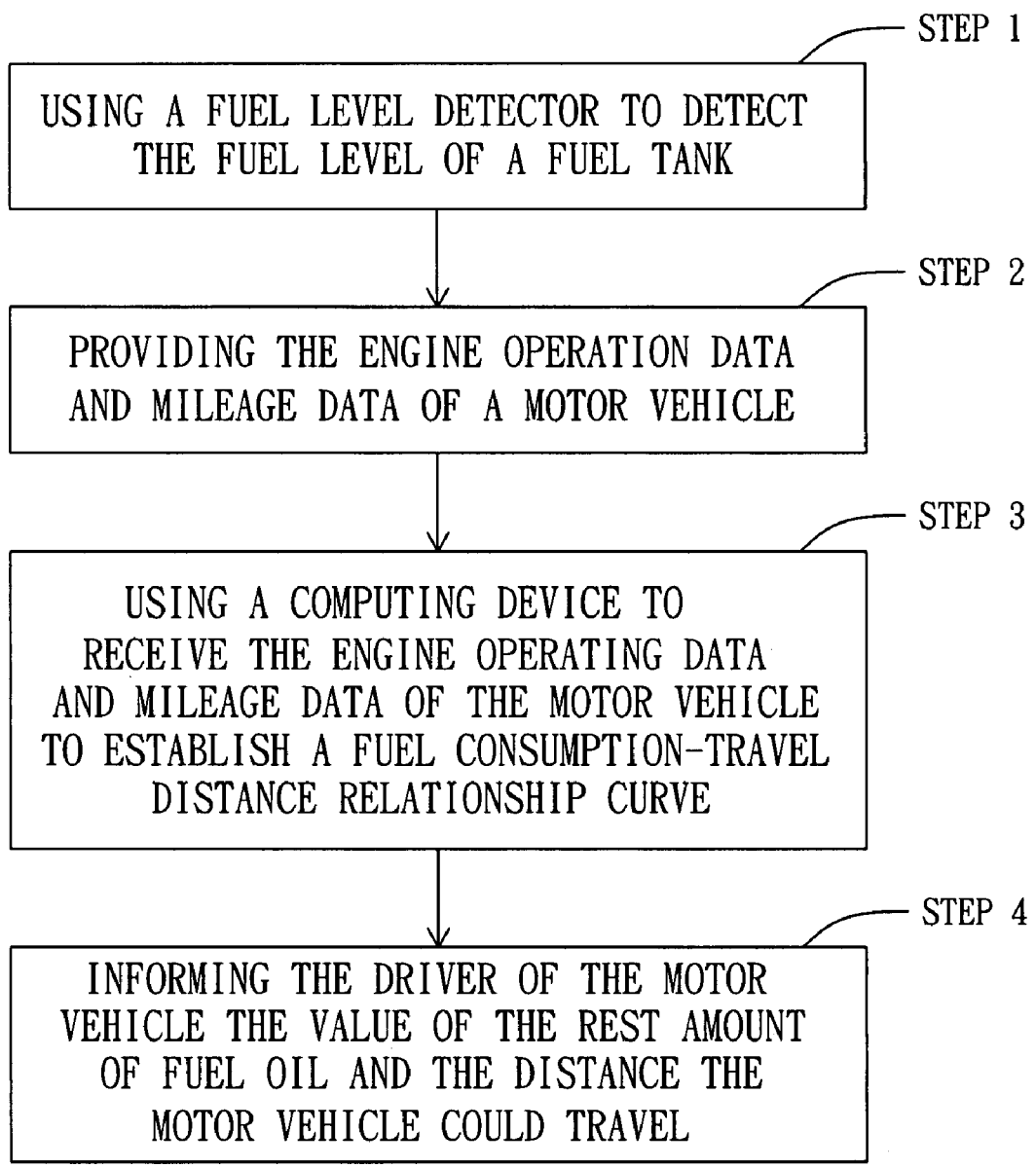
FIG. 7 is a flow chart showing the procedure of an intelligent fuel oil monitoring method according to the present invention.

The invention also provides an intelligent fuel oil monitoring method. FIG. 7 is a flow chart showing the procedure of the intelligent fuel oil monitoring method. This method includes the steps of (1) using a fuel level detector to detect the fuel level of a fuel tank, (2) providing the engine operation data and mileage data of a motor vehicle, (3) using a computing device to receive the engine operating data and traveling (mileage) data of the motor vehicle and then to establish a fuel consumption-travel distance relationship curve, and (4) informing the driver of the motor vehicle the value of the rest amount of fuel oil and the distance the motor vehicle could travel.

During step (1), a fuel level detector 10 is used to detect the level of the fuel oil in a fuel tank. The fuel level detector 10 can be float type fuel oil detector comprised of a float 11 and a variable resistor 12. The variable resistor 12 changes its resistance output subject to the position of the float 11.

During step (2), the traveled data of a motor vehicle as well as the engine operation data of the motor vehicle are provided.

During step (3), a computing device 20 is used to receive the engine operating data and traveling (mileage) data of the motor vehicle, and then to establish average speed-fuel consumption relationship curve 60 and fuel consumption-distance relationship curves 70~75 subject to the data received. The computing device 20 can be a microcontroller. The average speed-fuel consumption relationship curve 60 comprises a linear zone 61 and a nonlinear zone 62. The average speed within the linear zone 61 is directly proportional to the fuel consumption. The average speed within the linear zone 61 is the average of the speed of the motor vehicle at the initial 10 or 15 minutes after start. When increase the speed after over the linear zone 61, the fuel consumption is greatly increased because of increasing of wind resistance.

During step (4), the data of the value of the rest amount of fuel oil and the distance the motor vehicle could travel is informed to the driver by means of a display unit 30. The display unit 30 can be a LCD monitor or LED monitor.

Therefore, the intelligent fuel oil monitoring system and method of the present invention can accurately indicate the value of the current rest amount of fuel oil and the mileage the motor vehicle could travel through a display unit, eliminating the drawbacks of the conventional fuel oil monitoring devices.

Although particular embodiments of the invention have been described in detail for purposes of illustration, various modifications and enhancements may be made without departing from the spirit and scope of the invention.

What is claimed is:

1. An intelligent fuel oil monitoring system comprising:
   a fuel level detector coupled to a fuel tank of a motor vehicle and adapted to detect the amount data of a fuel oil in said fuel tank;
   a microcontroller coupled to said fuel level detector and adapted to receive traveling data of said motor vehicle and to establish an average speed-fuel consumption relationship curve and fuel consumption and travel distance relationship curves at different speeds and to calculate the distance the motor vehicle to travel based on the amount data of the fuel oil detected by said fuel level detector subject to said fuel consumption and travel distance relationship curve;
   a display unit coupled to said microcontroller and controlled by said microcontroller to display data;
   said average speed-fuel consumption relationship curve comprises a linear zone and a nonlinear zone;
   the average speed within said linear zone is directly proportional to the fuel consumption;
   the average speed within said linear zone is the average of the speed of said motor vehicle at the 10~15 minutes before calculating the average speed; and
   the fuel consumption is greatly increased because of increasing of wind resistance when increasing the speed which falling in said nonlinear zone.

2. An intelligent fuel oil monitoring method comprising the steps of:
   (1) using a fuel level detector to detect the fuel level of a fuel tank;
   (2) providing the traveling data of a motor vehicle;
   (3) using a computing device to receive the traveling data of said motor vehicle and to establish an average speed-fuel consumption relationship curve and fuel consumption-travel distance relationship curves subject to the received data, wherein said average speed-fuel consumption relationship curve comprises a linear zone and a nonlinear zone;
   the average speed within said linear zone is directly proportional to the fuel consumption;
   the average speed within said linear zone is the average of the speed of said motor vehicle at the 10~15 minutes before calculating the average speed;
   the fuel consumption is greatly increased because of increasing of wind resistance when increasing the speed which falling in said nonlinear zone; and
   (4) informing the driver of said motor vehicle the value of the rest amount of fuel oil and the mileage the motor vehicle capable to travel.

* * * * *